United States Patent [19]

Hata et al.

[11] Patent Number: 5,364,900
[45] Date of Patent: Nov. 15, 1994

[54] STABILIZED ACETAL RESIN COMPOSITIONS

[75] Inventors: Tadashige Hata; Sadao Ibe, both of Kurashiki, Japan

[73] Assignee: Asahi Kasei Kogyo Kabushiki Kaisha, Osaka, Japan

[21] Appl. No.: 219,571

[22] Filed: Mar. 29, 1994

[30] Foreign Application Priority Data

Apr. 8, 1993 [JP] Japan ................. 5-104930

[51] Int. Cl.$^5$ ............................................. C08K 5/13
[52] U.S. Cl. .................................... 524/291; 524/430; 524/433; 524/436; 524/437; 524/542; 524/405
[58] Field of Search .............. 524/405, 430, 433, 436, 524/437, 542, 291

[56] References Cited

U.S. PATENT DOCUMENTS

| | | | |
|---|---|---|---|
| 3,671,487 | 6/1972 | Abolins | 524/494 |
| 3,704,275 | 11/1972 | Burg et al. | 524/542 |
| 3,743,614 | 7/1973 | Wolters et al. | 524/291 |
| 3,839,497 | 10/1974 | Ishii et al. | 524/291 |
| 3,903,197 | 9/1975 | Ishida et al. | 524/542 |
| 3,960,984 | 6/1976 | Kohan | 260/857 F |
| 3,969,292 | 7/1976 | Wolters et al. | 524/291 |
| 4,562,216 | 12/1985 | Kishida et al. | 523/433 |
| 4,730,015 | 3/1988 | Ikenaga et al. | 524/291 |
| 4,731,396 | 3/1988 | Auerbach et al. | 524/542 |
| 4,780,498 | 10/1988 | Goerissen et al. | 524/542 |
| 4,786,659 | 11/1988 | McKie et al. | 524/542 |
| 4,837,400 | 6/1989 | Walter et al. | 524/291 |
| 4,861,814 | 8/1989 | Nakagawa et al. | 524/291 |

FOREIGN PATENT DOCUMENTS

| | | |
|---|---|---|
| 0078937 | 6/1986 | European Pat. Off. |
| 0065777 | 7/1986 | European Pat. Off. |
| 0449135 | 10/1991 | European Pat. Off. |
| 34-5440 | 7/1956 | Japan |
| 63-56552 | 3/1988 | Japan |
| 63-175306 | 7/1988 | Japan |
| 2/50948 | 2/1990 | Japan |
| 3-14859 | 1/1991 | Japan |

*Primary Examiner*—Veronica P. Hoke
*Attorney, Agent, or Firm*—Pennie & Edmonds

[57] ABSTRACT

The present invention provides an acetal resin composition comprising:

(A) 100 parts by weight of oxymethylene copolymers;

(B) 0.05 to 2 parts by weight of hindered phenol type antioxidants; and (C) 0.002 to 0.3 parts by weight of ion adsorbents selected from the group consisting of (i) an ion adsorbent comprising (a) one or more oxides selected from the alkaline metal oxides and the alkaline earth metal oxides and (b) one or more trivalent metallic oxides, and (ii) an ion adsorbent represented by the general formula:

$$M_{1\ 1-x}M_{2x}(OH)_2A^{n-}{}_{x/n} \cdot mH_2O \qquad (1)$$

wherein $M_1$ is one or more bivalent alkaline earth metal atoms, $M_2$ is a trivalent metal, $A^{n-}$ is an anion of valence n, $0 < X \leq 0.5$, and m is a positive number.

11 Claims, 2 Drawing Sheets

STABILIZED ACETAL RESIN COMPOSITIONS

BACKGROUND OF THE INVENTION

1. Field of the Invention

The present invention relates to acetal resin compositions overcoming the disadvantages of formation of excessive mold deposits and the smell of formaldehyde gas during mold processing and exhibiting excellent heat stability.

2. Description of Related Art

Acetal resins have been widely used as engineering resins in various fields, especially in electrical appliance and electronics industries, for their excellent mechanical and molding properties. Acetal resins, however, are easily decomposed by heating during mold processing to generate formaldehyde gas, which causes a deterioration of working environment. Moreover, the generated formaldehyde and volatile materials come from additives such as the stabilizer contained in the acetal resin, which separates out on the surface of a mold to form mold deposits. Since the mold deposits considerably deteriorate the surface of the moldings and decrease the accuracy in the dimension of the moldings, molds have to be disassembled to remove the mold deposits from their surface. This requires a great deal of labor and time so that productivity is reduced. Thus reduction of mold deposits has been strongly desired.

For the purpose of solving the above problems, there have been many proposals. Japanese Patent Publication No. 5440/1959 and U.S. Pat. No. 3,960,984 disclose acetal resin compositions containing polyamide and amide oligomers, respectively in order to reduce the amount of formaldehyde produced by the thermal decomposition. Japanese Patent Application Laid-Open No. 14859/1991 discloses an acetal resin composition comprising antioxidants having a sterically hindered phenolic structure, metal salts of carboxylic acids, and quaternary polyamides 6/66/610/12. These acetal resin compositions do not succeed in sufficiently controlling the bad smell of formaldehyde and the formation of mold deposits during the mold processing, since the polyacetals are not stabilized sufficiently.

Japanese Patent Application Laid-Open No. 50948/1990 discloses an acetal resin composition comprising the hydrotalcite of an ion adsorbent in order to improve molding strain (warpage) and cycle rate. U.S. Pat. No. 4,837,400 discloses acetal resin compositions containing hindered phenol type antioxidants, alkaline earth metal silicates and/or alkaline earth metal glycerophosphates whose heat stability is improved. The inventions described in the Japanese Patent Application Laid-Open and U.S. Patent, however, do not aim at reducing mold deposits so that the disclosed acetal resin compositions do not show the effects of the present invention.

As described above, conventional acetal resin compositions produce excessive molding deposits and formaldehyde gas in the molding process, and do not show a very good heat stability.

SUMMARY OF THE INVENTION

The present invention relates to a novel acetal resin composition comprising specific oxymethylene copolymers, hindered phenol type antioxidants, and ion adsorbents. The acetal resin compositions of the present invention are capable of avoiding the formation of mold deposits and the smell of formaldehyde gas during mold processing and show excellent heat stability. According to the present invention, working environment is considerably improved, and continuous molding can be carried out for a long period. As a result, the productivity is drastically improved.

DETAILED DESCRIPTION OF THE INVENTION

Figure 1A:
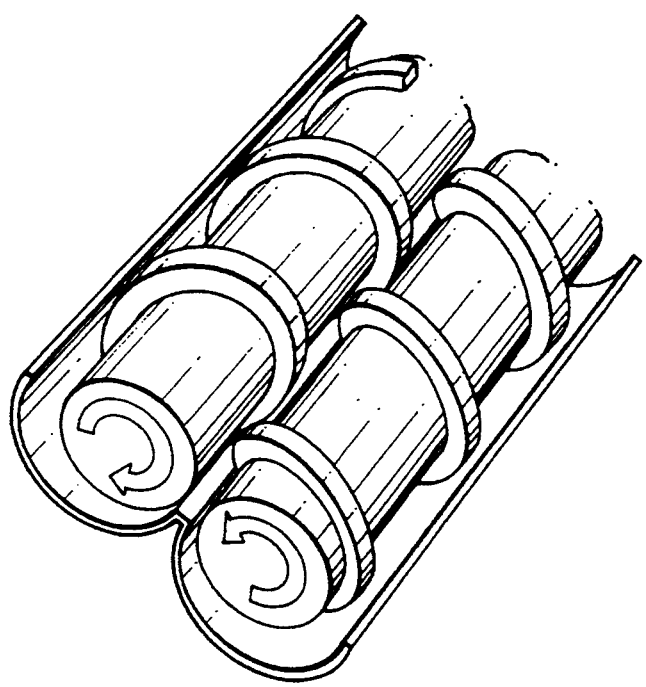
FIG. 1A is a perspective view of a different directional anti-gearing type twin screw used in the present invention.
Figure 1B:
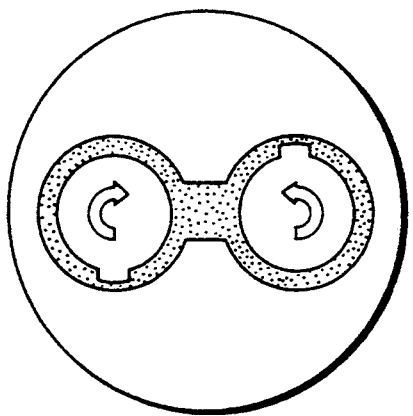
FIG. 1B is a cross-section view of a different directional anti-gearing type twin screw used in the present invention.
Figure 2:
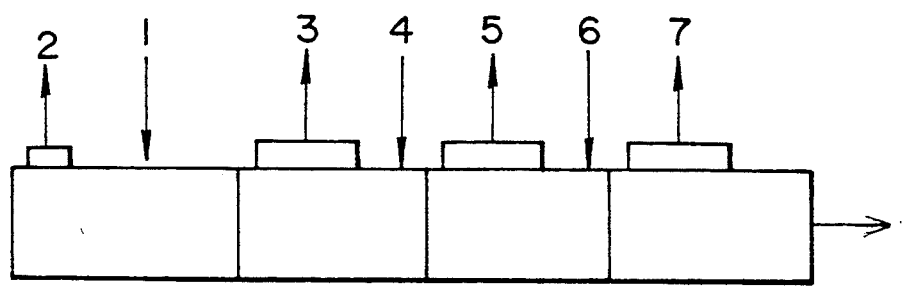
FIG. 2 is a schematic representation of a method and apparatus for removing volatile materials in the Reference Example.

One aspect of the present invention is to provide an acetal resin composition comprising:

(A) 100 parts by weight of oxymethylene copolymers generating 500 ppm or less of formaldehyde gas when heated at 230° C. for 60 minutes under nitrogen flow;

(B) 0.05 to 2 parts by weight of hindered phenol type antioxidants generating 5% by weight or less of volatile materials based on the total amount of the hindered phenol type antioxidants when heated at 230° C. for 60 minutes under air flow; and (C) 0.002 to 0.3 parts by weight of ion adsorbents selected from the group consisting of (i) an ion adsorbent comprising (a) one or more oxides selected from the alkaline metal oxides and the alkaline earth metal oxides and (b) one or more trivalent metallic oxides, and (ii) an ion adsorbent represented by the general formula (1):

$$M_{1\ 1-x}M_{2x}(OH)_2A^{n-}{}_{x/n}\cdot mH_2O \tag{1}$$

wherein $M_1$ is one or more bivalent alkaline earth metal atoms, $M_2$ is a trivalent metal, $A^{n-}$ is an anion of valence n, $0 < X \leq 0.5$, and m is a positive number.

Oxymethylene copolymers used in the present invention for Component (A) should not generate over 500 ppm of formaldehyde when they are heated at 230° C. for 60 minutes under nitrogen flow. When the amount is over 500 ppm, the smell of formaldehyde and mold deposits are not sufficiently inhibited. It is preferred that the oxymethylene copolymers generate 300 ppm or less of formaldehyde when heated at 230° C. for 60 minutes under nitrogen flow.

The polyoxymethylene copolymers used in the present invention include polyoxymethylene copolymers having randomly incorporated oxyalkylene units represented by the general formula (2) containing oxymethylene units —(CH$_2$O)— which are produced by copolymerizing a formaldehyde monomer or cyclic oligomers such as trioxan with cyclic ethers such as 1,3-dioxolane and ethylene oxide or cyclic formal; branched oxymethylene copolymers; and oxymethylene block copolymers containing 50% by weight or more of repeating units of oxymethylene and 50% by weight or less of other polymer units.

wherein $R_1$ and $R_2$ are selected from hydrogen atom, alkyl groups and aryl groups, and n is an integer in the range of 2 to 6.

The oxyalkylene unit content is 0.05 to 50 mole, preferably 0.1 to 20 mole, based on 100 mole of oxymethylene units in the oxymethylene copolymers.

Representative examples of the oxyalkylene units include oxyethylene units, oxypropylene units, oxytetramethylene units, oxybutylene units and oxyphenylethylene units and the like. Of these, oxyethylene units —$[(CH_2)_2O]$— and oxytetramethylene units —$[(CH_2)_4O]$— are more preferred for the purpose of improving the characteristics of acetal resin compositions.

The unstable termini of oxymethylene copolymer chains containing hydroxyl groups may be stabilized by conversion of the hydroxyls to esters, ethers, urethanes or the like. The unstable termini may be also removed by hydrolysis.

The oxymethylene copolymers used in the present invention for Component (A) can be produced as follows: oxymethylene copolymers are produced by copolymerizing formaldehyde or trioxan with cyclic ethers or cyclic formal. Immediately after polymerizing, the hydroxyl groups of the polymer chains are stabilized. The oxymethylene copolymer in the molten state is then fed to a different directional anti-gearing type twin-screw extruder using a process comprising two steps of feeding water, alcohol or their mixture, mixing with the oxymethylene copolymer, and removing the resulting gases of compounds having hydroxyl groups and free formaldehyde. Thus volatile materials are removed from the oxymethylene copolymers. It is preferred that triethylamine be used as a pH adjuster when water, alcohol, or their mixture are fed into the extruder.

Hindered phenol type antioxidants used in the present invention for Component (B) generate 5% by weight or less of volatile materials based on the total amount of the the hindered phenol type antioxidants when they are heated at 230° C. for 60 minutes under an air flow. Representative examples of the hindered phenol type antioxidants include 1,3,5-trimethyl-2,4,6-tris(3,5-di-t-butyl-4-hydroxybenzyl)benzene, triethylene glycol-bis[3-(3-t-butyl-5-methyl-4-hydroxyphenyl)propionate], 3,9-bis[1,1-dimethyl-2-{β-(3-t-butyl-4-hydroxy-5-methylphenyl)propionyloxy}ethyl]-2,4,8,10-tetraoxaspiro [5.5]undecane, pentaerythrityl-tetrakis[3-(3,5-di-t-butyl-4-hydroxyphenyl)propionate], N,N'-hexamethylenebis(3,5-di-t-butyl-4-hydroxy-hydrocinnamide), 1,6-hexanediol-bis[3-(3,5-di-t-butyl-4-hydroxyphenyl)-propionate], 1,3,5-trimethyl-2,4,6-tris(3,5-di-t-butyl-4-hydroxybenzyl)benzene, N,N'-bis[3-(3,5-di-t-butyl-4-hydroxyphenyl)propionyl]hydrazine, 1,3,5-tris(4-t-butyl-3-hydroxy-2,6-dimethylbenzyl)isocyanuric acid and the like. Of these, triethylene glycol-bis[3-(3-t-butyl-5-methyl-4-hydroxyphenyl)propionate], pentaerythrityl-tetrakis[3-(3,5-di-t-butyl-4-hydroxyphenyl)-propionate], 3,9-bis[1,1-dimethyl-2-{β-(3-t-butyl-4-hydroxy-5-methylphenyl)propionyloxy}ethyl]-2,4,8,10-tetraoxaspiro[5.5]undecane-1,3,5-tris(4-t-butyl-3-hydroxy-2,6-dimethylbenzyl)isocyanuric acid are preferred.

The hindered phenol type antioxidants used in the present invention may be employed individually or in combination.

In the present invention, hindered amine type light stabilizers generating 5% by weight or less of volatile materials, based on the total amount of the hindered amine type light stabilizers, when heated at 230° C. for 60 minutes under air flow may be used with the above mentioned hindered phenol type antioxidant. Representative examples of hindered amine type light stabilizers include 2-(3,5-di-t-butyl-4-hydroxybenzyl)-2-n-butyl-malonate-bis(1,2,2,6,6-pentamethyl-4-piperidyl), 1-[2-{3-(3,5-di-t-butyl-4-hydroxyphenyl)propionyloxy}ethyl]-4-{3-(3,5di-t-butyl-4-hydrocyphenyl)propionloxy}-2,2,6,6-tetramethylpiperidine, dimethylsuccinate-1-(2-hydroxyethyl)-4-hydroxy-2,2,6,6-tetramethylpiperidyl polycondensate, poly[{6-(1,1,3,3-tetramethylbutyl)imino-1,3,5-triazine-2,4-diyl}{(2,2,6,6-tetramethyl-4-piperidyl)imino}hexamethylene {(2,2,6,6-tetramathyl-4-piperidyl)imino}], N,N'-bis(3-aminopropyl)ethylenediamine/2,4-bis[N-butyl-N-(1,2,2,6,6-pentamethly-4-piperydyl)amino]-6-chloro-1,3,5-triazine condensate and the like.

The hindered amine type light stabilizers may be employed individually or in combination.

The amount of hindered phenol type antioxidant is in the range of 0.05 to 2 parts by weight, preferably 0.1 to 1 parts by weight based on 100 parts by weight of oxymethylene copolymer. When its amount is less than 0.05 parts by weight, the heat stability of the acetal resin composition becomes poor. When its amount is more than 2 parts by weight, mold deposits are generated. When the hindered amine type light stabilizers are employed with the antioxidants, the amount of the antioxidants is 0.05 parts by weight or more so as to show the effects of the present invention.

One of the ion adsorbents used in the present invention as Component (C) is an ion adsorbent comprising one or more oxides selected from alkaline metal oxides and alkaline earth metal oxides, and one or more trivalent metallic oxides.

Representative examples of alkaline metal oxides include $Na_2O$, $K_2O$, $Li_2O$ and the like, $Na_2O$ is preferred. Representative examples of alkaline earth metal oxides include BaO, MgO, SrO and the like. MgO is preferred. Representative examples of trivalent metallic oxides include $Al_2O_3$, $Ge_2O_3$, $In_2O_3$, $B_2O_3$ and the like. $Al_2O_3$ is preferred. Representative examples of the ion adsorbents comprising two or more of these oxides include 2.5 $MgO.Al_2O_3.nH_2O$, $Al_2O_3.Na_2O.nH_2O$, $Mg_{0.7}Al_{0.3}O_{1.15}$, $Mg_{0.75}Al_{0.25}O_{1.125}$ and the like.

The other ion adsorbents used in the present invention are represented by the general formula (1):

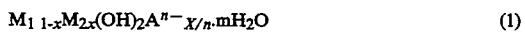

wherein $M_1$ is one or more bivalent alkaline earth metal atoms, preferably Mg and Ca; $M_2$ is a trivalent metal such as B, Al, Ga, In, and Tl, preferably Al; $A^{n-}$ is an anion of valence n such as $CO_3^{2-}$, $OH^-$, $HCO_3^-$, $H_2PO_4^-$, $NO_3^-$, $I^-$, salicylate, citrate, tartarate and the like, preferably $CO_3^{2-}$ and $OH^-$; $0 < X \leq 0.5$; and m is a positive number.

Representative examples of the ion adsorbents represented by the general formula (1) include natural hydrotalcite such as $Mg_{0.75}Al_{0.25}(OH)_2(CO_3)_{0.125}.0.5H_2O$, and synthetic hydrotalcites such as $Mg_{4.5}Al_2(OH)_{13}CO_3.3.5H_2O$ and $Mg_6Al_2(OH)_{16}CO_3.4H_2O$.

From the standpoint of adsorbability, the first class of ion adsorbents is preferred.

The particle size of the ion adsorbents is not particularly limited. For the purpose of improving dispersibility of the ion adsorbents, the average particle diameter is preferably 100 μm or less. The ion adsorbents may be treated with a surface treatment agent to improve compatibility with the oxymethylene polymer as well as dispersibility. Suitable surface treatment agents are organic acids, having 2 to 30 of carbon atoms and one or more COOH groups, and/or primary, secondary and tertiary alcohols having 2 to 30 carbon atoms, and metallic salts comprising the above-mentioned organic acids and alcohols, and metals selected from an alkaline metal, an alkaline earth metal, and aluminum. Representative examples of surface treatment agents are stearic acid, linolic acid, oleic acid, lauric acid, sodium stearate, magnesium stearate, and sodium oleate.

The ion adsorbents used in the present invention may be freed of their water of crystallization. The water removal can be easily carried out by heating at about 110° to 400° C. for about 1 to 40 hours under air, $N_2$, He, $O_2$, and $CO_2$ and the like.

The above-mentioned ion adsorbents may be used individually or in combination. The amount of the ion adsorbents is 0.002 to 0.3 parts by weight based on 100 parts by weight of oxymethylene copolymer, preferably 0.005 to 0.1 parts by weight. When it is under 0.002 parts by weight, the inhibition of the mold deposits during mold processing is not satisfatory. When it is over 0.3 parts by weight, the stability of acetal resin composition becomes poor, and formation of the mold deposits is facilitated.

In order to overcome the disadvantages of formation of excessive mold deposits and smell of formaldehyde, and to impart heat stability, the acetal resin compositions of the present invention need to comprise the above-mentioned three Components (A), (B) and (C).

In the present invention, known heat stabilizers may be added as formaldehyde scavengers such as a polyamide resin, amide compounds, urea derivatives and triazine derivatives.

Suitable polyamide resins are nylon 6, nylon 11, nylon 12, nylon 6.6, nylon 6.10, nylon 6/6.10, nylon 6/6.6, nylon 6.6/6.10, nylon 6/6.6/6.10, poly β-alanine and the like.

Suitable amide compounds are stearly stearic acid amide, stearly oleic acid amide, stearly erucic acid amide, ethylenediamine-distearic acid amide, ethylenediamine-dibehenic acid amide, hexamethylenediamine-distearic acid amide, ethylenediamine-dioleic acid amide, ethylenediamine-dierucic acid amide, xylylenediamine-dierucic acid amide, di(xylylenediamine-stearic acid amide)sebacic acid and the like.

Suitable urea derivatives are N-phenylurea, N,N'-diphenylurea, N-phenylthiourea, N,N'-diphenylthiourea and the like.

Suitable triazine derivatives are melamine, benzoguanamine, N-phenylmelamine, melem, N,N'-diphenylmelemine, N-methylolmelamine, N,N'-trimethylolmelamine, 2,4-diamino-6-cyclohexyltriazine, melam and the like.

These heat stabilizer may be used individually or in combination. Of these, nylon 66, poly β-alanine, ethylenediamine-distearic acid amide, ethylenediamine-dibehenic acid amide, ethylenediamine-dierucic acid amide, di(xylylenediamine-stearic acid amide)sebacic acid amide are preferred.

Further, in the present invention, other additives such as a lubricant, a parting agent, an antistatic agent, an inorganic filler such as glass fiber, a reinforcing agent such as carbon fiber, or a pigment may be further mixed, if desired. So as not to harm the effects of the present invention, it is preferred that such heat stabilizers and other additives do not decompose polyoxymethylene, and that they have high heat stability.

The acetal resin composition of the present invention is produced by mixing all components using an ordinary mixing method. The heat stabilizers and other additives may be mixed with them. They may be added in the form of particle or in the molten state.

The present invention is described in greater detail in the following Examples, but its scope is not restricted by them.

In the Examples and Comparative Examples, the characteristics of the acetal resin compositions, components, and moldings were determined as follows:

1. Amount of formaldehyde gas generated from oxymethylene copolymers:

3 g of the oxymethylene copolymer was put in an aluminum vessel and heated at 230° C. for 60 minutes under nitrogen flow (6N l/min). The formaldehyde gas generated was introduced into 1M sodium sulfite solution, and titrated with 0.01N HCl.

2. Amount of the volatile materials:

50 mg of hindered phenol type antioxidant or hindered amine type light stabilizer was fed in a thermobalance with 5Nl/hr of air, and the temperature was raised at a rate of 20° C. per minute from 40° to 230° C. It was heated at 230° C. for 60 minutes, and the decreased weight of the sample was measured.

3. Evaluation of mold deposits formed during continuous molding:

Using the acetal resin composition of the present invention, 5000 shots were continuously carried out with an injection molding machine (manufactured by Toyo Machinery & Metal Co., Ltd. under the tradename of Ti-30G) under the following conditions:

Injection pressure: 500 kg/cm$^2$
Injection rate: 60%
Cylinder temperature: 225° C.
Injection time: 6 sec.
Cooling time: 4 sec.
Mold temperature: 40° C.
Molding Dimensions: 35 mm (length)×14 mm (width)×2 mm (thickness)
Mold type: Pin Point Gate type mold The mold deposits attached to the mold were evaluated visually and their presence was described using the following symbols.

⊚: not observed at all
○: hardly observed
△: slightly observed
×: clearly observed
××: heavily attached 4. Heat stability of the moldings:

The moldings obtained according to the present invention were subjected to the hot-air test at 140° C. for 400 hours in a gear oven (manufactured by TABAI ESPEC CORP, GSP-222 type; the exhaust duct was opened by 20 degrees). The tensile elongation of the moldings before and after the treatment was measured according to ASTM D-638. The retaining ratio (%) is calculated using the following equation:

Retaining ratio (%)=(B/A)×100

A: tensile elongation before the treatment
B: tensile elongation after the treatment 5. Amount of formaldehyde eluted from the moldings:

Immediately after molding, the moldings were immersed in 200 ml of water to extract formaldehyde at 95° C. for 3 hours. The concentration of formaldehyde in the solution obtained was estimated by comparing the color of the solution with the color of a solution of acetylaceton as a standard. The amount of the eluted formaldehyde was expressed in ppm per unit weight of the moldings.

The symbols used in Tables 1 and 2 are as follows:
Hindered phenol-type antioxidant
- A-1: triethylene glycol-bis {3-(3-t-butyl-5-methyl-4-hydroxyphenyl)propionate}
- A-2: pentaerythrityl-tetrakis {3-(3,5-di-t-butyl-4-hydroxyphenyl)propionate}
- A-3: 3,9-bis {1,1-dimethyl-2{β-(3-t-butyl-4-hydroxy-5-methylphenyl)propionyloxy}ethyl}-2,4,8,10-tetraoxaspiro[5.5]undecane
- A-4: 2,2'-methylenebis(4-methyl-6-t-butylphenol)
- A-5: 2-t-butyl-6-(3'-t-butyl-5'-methyl-2'-hydroxybenzyl)4-methylphenylacrylate
- A-6: 1,3,5-tris(4-t-butyl-3-hydroxy-2,6-dimethylbenzyl)isocyanuric acid Hindered amine-type light stabilizer
- L-1: poly[{6-(1,1,3-tetramethylbutyl)imino-1,3,5-triazine-2,4-diyl}{(2,2,6,6-tetramethyl-4-piperidyl)imino} hexamethylene {2,2,6,6-tetramethyl-4-pipelydyl)imino]}
- L-2: N,N'-bis(3-aminopropyl)ethylenediamine/2,4-bis{N-butyl-N-(1,2,2,6,6,-pentamethyl-4-piperidyl-)amino}-6-chloro-1,3,5-triazine condensate
- L-3: 1-[2-{3-(3,5-di-t-butyl-4-hydroxyphenyl) propionyloxy}ethyl]-4-{3-(3,5-di-t-butyl-4-hydroxyphenyl)propionyloxy}-2,2,6,6-tetramethylpiperidine
- L-4: bis(2,2,6,6-tetramethyl-4-piperydyl)sebacate
- L-5: bis(1,2,2,6,6-pentamethyl-4-piperydyl)sebacate Reference Example Production of oxymethylene copolymer Oxymethylene copolymer comprising 97.8% by weight of oxymethylene units (—OCH$_2$—) derived from trioxane and 2.2% by weight of oxyethylene units (—OCH$_2$CH$_2$—) derived from 1,3-dioxolane was produced in the presence of boron trifluoride dibutyl ether as a catalyst. In accordance with U.S. Pat. No. 3,318,848, the oxymethylene copolymer obtained was hydrolyzed in 60/40 methyl alcohol/water solution containing 0.1% NH$_3$ at 200° C. to be stabilized . The resulting copolymer had a Melt Index of 9.1 g/10 min. and generated 4100 ppm of formaldehyde gas.

The molten oxymethylene copolymer (30 kg) was fed to feed opening 1 of a different directional anti-gearing type twin screw extruder having an inner diameter of 30 mm and 48:1 of extruder length to diameter ratio (manufactured by Welding Engineers, Inc.) at 210° C. Rear vent 2 and vent 3 were adjusted to produce vacuums of 150 mmHg and 30 mmHg, respectively, to remove volatile materials. Aqueous triethylamine solution, 15% by weight, was poured into bung hole 4 at a feed rate of 1 kg per hour and kneaded. Vent 5 was then adjusted to 50 mmHg to remove volatile materials. After the aqueous triethylamine solution was poured into bung hole 6, at a feed rate of 0.5 kg per hour, the volatile materials were removed from vent 7 under a vacuum of 30 mmHg. The molten copolymer was extruded, and pelletized with a strand cutter. The temperature of the molten copolymer was retained at 210° C. during the extraction process. Using the method described above, the amount of formaldehyde gas generated from the oxymethylene copolymer obtained was found to be 150 ppm.

Substantially, the same procedure as described above was repeated, except that rear vent 2 and vent 5 were closed, bung hole 6 was closed to stop the pouring of aqueous triethylamine solution, and vents 3 and 7 were adjusted at 200 mmHg and 30 mmHg, respectively. The amount of formaldehyde gas generated from the oxymethylene copolymer obtained was found to be 410 ppm.

Various oxymethylene copolymers generating various amounts of formaldehyde gas shown in Tables 1 and 2, were produced by changing production conditions, such as the pressure of vents, the temperature of the molten oxymethylene copolymer, and the concentration and feed rate of aqueous triethyleamine solution.

Examples 1 to 23

Oxymethylene copolymers, 100 parts by weight, obtained by polymerizing 96.3% by weight of trioxane and 3.7% by weight of 1,3-dioxolane, as described in the Reference Example, were mixed uniformly with the hindered phenol-type antioxidants and hindered amine-type light stabilizers and ion adsorbents shown in Table 1 using a Henschel mixer. The particle diameter of the ion adsorbents used were as follows: Mg$_{0.75}$Al$_{0.25}$O$_{1.125}$, 2–9 μm; Mg$_{0.7}$Al$_{0.3}$O$_{1.15}$, 2–9 μm; 2.5MgO.Al$_2$O$_3$.nH$_2$O, 40–70 μm; Al$_2$O$_3$.Na$_2$O.nH$_2$O, 40–70 μm; Mg$_{4.5}$Al$_2$(OH)$_{13}$CO$_3$.3.5H$_2$O, 40–70 μm. The mixture obtained was then fed to a 50 Φ extruder to extrude into strands through a die head. The resulting strands were pelletized to obtain acetal resin compositions. They were dried and their characteristics measured. The results are shown in Table 1. The acetal resin compositions obtained in the Examples of the present invention reduce the formation of mold deposits and the smell of formaldehyde during the molding process, while showing excellent heat stability.

Comparative Examples 1 to 21

Acetal resin compositions were produced by the same method as described in the Examples but with the components shown in Table 2. Their characteristics were measured by the same method as described in the Examples, and the results are shown in Table 2. In Reference Example Nos. 20 and 21 the preparations were carried out using ion adsorbents disclosed in Japanese Patent Application Laid-Open Nos. 56552/1988 and 50948/1990, respectively. The particle diameter of the ion adsorbents used were as follows: MgO.1.5SiO$_2$.nH$_2$O, 20–40 μm, and Mg$_{0.7}$Al$_2$(OH)$_2$CO$_{0.15}$.0.54-H$_2$O, 40–70 μm. None of the acetal resin compositions obtained in the Reference Examples showed all three effects of the present invention at the same time

TABLE I

| Hindered phenol-type antioxidant (Component B) | Evaluation |
| --- | --- |

TABLE 1-continued

| Example | Amount of formaldehyde gas (ppm) | (parts by wt.)* | Volatile materials (%) | Ion adsorbent (Component C) (part by wt.) | Mold deposits | Amount of formaldehyde (ppm) | Heat stability (%) |
| --- | --- | --- | --- | --- | --- | --- | --- |
| 1  | 150 | A-1 (0.1) | 4.1 | $Mg_{0.75}Al_{0.25}O_{1.125}$ (0.01) | ⊙ | 1.2 | 78 |
| 2  | 150 | A-1 (0.3) | 4.1 | $Mg_{0.75}Al_{0.25}O_{1.125}$ (0.01) | ⊙ | 2.1 | 82 |
| 3  | 150 | A-1 (0.6) | 4.1 | $Mg_{0.75}Al_{0.25}O_{1.125}$ (0.01) | ⊙ | 0.9 | 88 |
| 4  | 150 | A-1 (1.0) | 4.1 | $Mg_{0.75}Al_{0.25}O_{1.125}$ (0.01) | ⊙ | 0.8 | 93 |
| 5  | 150 | A-1 (1.5) | 4.1 | $Mg_{0.75}Al_{0.25}O_{1.125}$ (0.01) | ○ | 2.3 | 98 |
| 6  | 110 | A-2 (0.3) | 2.1 | $Mg_{0.7}Al_{0.3}O_{1.15}$ (0.01) | ⊙ | 2.1 | 84 |
| 7  | 210 | A-2 (0.3) | 2.1 | $Mg_{0.7}Al_{0.3}O_{1.15}$ (0.01) | ⊙ | 2.8 | 86 |
| 8  | 300 | A-2 (0.3) | 2.1 | $Mg_{0.7}Al_{0.3}O_{1.15}$ (0.01) | ⊙ | 4.1 | 87 |
| 9  | 410 | A-2 (0.3) | 2.1 | $Mg_{0.7}Al_{0.3}O_{1.15}$ (0.01) | ○ | 4.5 | 90 |
| 10 | 150 | A-3 (0.3) | 2.5 | $2.5MgO \cdot Al_2O_3 \cdot nH_2O$ (0.003) | ○ | 11 | 75 |
| 11 | 150 | A-3 (0.3) | 2.5 | $2.5MgO \cdot Al_2O_3 \cdot nH_2O$ (0.005) | ⊙ | 1.1 | 81 |
| 12 | 150 | A-3 (0.3) | 2.5 | $2.5MgO \cdot Al_2O_3 \cdot nH_2O$ (0.01) | ⊙ | 1.7 | 89 |
| 13 | 150 | A-3 (0.3) | 2.5 | $2.5MgO \cdot Al_2O_3 \cdot nH_2O$ (0.05) | ⊙ | 1.2 | 88 |
| 14 | 150 | A-3 (0.3) | 2.5 | $2.5MgO \cdot Al_2O_3 \cdot nH_2O$ (0.10) | ⊙ | 5.0 | 81 |
| 15 | 150 | A-3 (0.3) | 2.5 | $2.5MgO \cdot Al_2O_3 \cdot nH_2O$ (0.20) | ○ | 14 | 72 |

| Example | Amount of formaldehyde gas (ppm) | Hindered phenol-type antioxidant (Component B) (parts by wt.)* | volatile materials (wt. %) | Hindered amine-type light satbilizer (Component B) (parts by wt.)* | Volatile materials (wt. %) | Ion adsorbent (Component C) (parts by wt.) | Mold deposits | Amount of formaldehyde (ppm) | Heat stability (%) |
| --- | --- | --- | --- | --- | --- | --- | --- | --- | --- |
| 16 | 210 | A-1 (0.1) | 4.1 | L-1 (0.6) | 0.2 | $Al_2O_3 \cdot Na_2O \cdot nH_2O$ (0.02) | ⊙ | 2.5 | 81 |
| 17 | 210 | A-2 (0.1) | 2.1 | L-2 (0.6) | 0.5 | $Al_2O_3 \cdot Na_2O \cdot nH_2O$ (0.01) $Mg_{0.75}Al_{0.25}O_{1.125}$ (0.01) | ⊙ | 3.8 | 84 |
| 18 | 210 | A-1 (0.2) | 4.1 | L-3 (0.6) | 0.5 | $Mg_{0.7}Al_{0.3}O_{1.15}$ (0.01) $2.5MgO \cdot Al_2O_3 \cdot nH_2O$ (0.01) | ⊙ | 3.1 | 81 |
| 19 | 150 | A-1 (0.3) | 4.1 | L-1 (0.3) | 0.2 | $Mg_{0.75}Al_{0.25}O_{1.125}$ (0.01) | ⊙ | 1.8 | 82 |
| 20 | 150 | A-2 (0.3) | 2.1 | L-2 (0.30) | 0.5 | $Mg_{0.75}Al_{0.25}O_{1.125}$ (0.05) $2.5MgO \cdot Al_2O_3 \cdot nH_2O$ (0.05) | ⊙ | 2.1 | 90 |
| 21 | 150 | A-3 (0.3) | 2.5 | — | — | $Mg_{0.75}Al_{0.25}(OH)_2(CO_3)_{0.125} \cdot 0.5H_2O$ (0.01) | ○ | 6.3 | 78 |
| 22 | 150 | A-1 (0.3) | 2.5 | — | — | $Mg_{4.5}Al_2(OH)_{13}CO_3 \cdot 3.5H_2O$ (0.01) | ○ | 7.2 | 79 |
| 23 | 150 | A-6 (0.2) | 1.3 | — | — | $Mg_{0.75}Al_{0.25}O_{1.125}$ (0.01) | ⊙ | 1.5 | 88 |

*Based on 100 parts by weight of oxymethylene copolymer

TABLE 2

| Comp. Example | Amount of formaldehyde gas (ppm) | Hindered phenol-type antioxidant (Component B) (parts by wt.)* | volatile materials (wt. %) | Hindered amine-type light satbilizer (Component B) (parts by wt.)* | Volatile materials (wt. %) | Ion adsorbent (Component C) (parts by wt.) | Mold deposits | Amount of formaldehyde (ppm) | Heat stability (%) |
| --- | --- | --- | --- | --- | --- | --- | --- | --- | --- |
| 1  | 650  | A-2 (0.3)  | 2.1 | — | — | $Mg_{0.75}Al_{0.75}O_{1.125}$ (0.01) | Δ  | 31.1 | 68 |
| 2  | 840  | A-2 (0.3)  | 2.1 | — | — | $Mg_{0.75}Al_{0.25}O_{1.125}$ (0.01) | X  | 72.1 | 51 |
| 3  | 840  | A-2 (0.3)  | 2.1 | — | — | $Mg_{4.5}Al_2(OH)_{13}CO_3 \cdot 3.5H_2O$ (0.01) | XX | 120  | 57 |
| 4  | 1200 | A-2 (0.3)  | 2.1 | — | — | $Mg_{0.75}Al_{0.25}O_{1.125}$ (0.01) | XX | 110  | 49 |
| 5  | 150  | A-1 (2.5)  | 4.1 | — | — | $Mg_{0.75}Al_{0.25}O_{1.125}$ (0.01) | X  | 3.1  | 98 |
| 6  | 150  | A-1 (4.0)  | 4.1 | — | — | $Mg_{0.75}Al_{0.25}O_{1.125}$ (0.01) | XX | 2.8  | 98 |
| 7  | 150  | A-1 (0.03) | 4.1 | — | — | $Mg_{0.75}Al_{0.25}O_{1.125}$ (0.01) | XX | 621  | 12 |
| 8  | 150  | A-4 (0.3)  | 11  | — | — | $Mg_{0.7}Al_{0.3}O_{1.15}$ (0.01) | X  | 4.1  | 89 |
| 9  | 150  | A-5 (0.3)  | 16  | — | — | $Mg_{0.7}Al_{0.3}O_{1.15}$ (0.01) | XX | 5.1  | 87 |
| 10 | 150  | A-1 (0.3)  | 4.1 | L-4 (0.3) | 17 | $2.5MgO \cdot Al_2O_3 \cdot nH_2O$ (0.01) | XX | 4.2  | 85 |
| 11 | 150  | A-2 (0.3)  | 2.1 | L-5 (0.3) | 19 | $2.5MgO \cdot Al_2O_3 \cdot nH_2O$ (0.01) | XX | 3.8  | 84 |
| 12 | 150  | A-3 (0.3)  | 2.5 | — | — | $Mg_{0.75}Al_{0.25}O_{1.125}$ (0.35) | X  | 140  | 32 |
| 13 | 150  | A-3 (0.3)  | 2.5 | — | — | $Mg_{0.75}Al_{0.25}O_{1.125}$ (0.5) | XX | 160  | 22 |
| 14 | 150  | A-2 (0.3)  | 2.1 | — | — | $Mg_{0.75}Al_{0.25}O_{1.125}$ (0.01) | Δ  | 26   | 71 |
| 15 | 130  | A-1 (0.3)  | 4.1 | — | — | — | X  | 41.0 | 51 |
| 16 | 130  | A-3 (0.3)  | 2.5 | — | — | — | X  | 51   | 87 |
| 17 | 130  | A-1 (0.3)  | 4.1 | L-1 (0.3) | 0.2 | — | X  | 48   | 89 |
| 18 | 130  | —          | —   | — | — | — | ** |      |    |
| 19 | 130  | —          | —   | L-1 (0.3) | 0.2 | $Mg_{0.75}Al_{0.25}O_{1.125}$ (0.01) | XX | 823  | N.D. |
| 20 | 840  | A-2 (0.3)  | 2.1 | — | — | $MgO \cdot 1.5SiO_2 \cdot nH_2O$ (0.1) | X  | 41   | 62 |
| 21 | 840  | A-1 (0.3)  | 2.1 | — | — | $Mg_{0.7}Al_{0.3}(OH)_2(CO_3)_{0.15} \cdot 0.54H_2O$ (0.1) | X  | 38   | 59 |

*Based on 100 parts by weight of oxymethylene copolymer
**The experiment was stopped due to strong smell of formaldehyde

What is claimed:

1. An acetal resin composition comprising
(A) 100 parts by weight of oxymethylene copolymers generating 500 ppm or less of formaldehyde gas when heated at 230° C. for 60 minutes under nitrogen flow;
(B) 0.05 to 2 parts by weight of hindered phenol type antioxidants generating 5% by weight or less of volatile materials based on the total amount of the hindered phenol type antioxidants when heated at 230° C. for 60 minutes under air flow; and (C) 0.002 to 0.3 parts by weight of ion adsorbents selected from the group consisting of (i) an ion adsorbent comprising (a) one or more oxides selected from the alkaline metal oxides and the alkaline earth metal oxides and (b) one or more trivalent metallic oxides, and (ii) an ion adsorbent represented by the general formula:

$$M_{1\ 1-x}M_{2x}(OH)_2A^{n-}_{x/n}\cdot mH_2O \qquad (1)$$

wherein, $M_1$ is one or more bivalent alkaline earth metal atoms, $M_2$ is a trivalent metal, $A^{n-}$ is an anion of valence n, $0 < X \leq 0.5$, and m is a positive number.

2. The acetal resin composition according to claim 1, wherein the oxymethylene copolymer generates 300 ppm or less of formaldehyde gas when heated at 230° C. for 60 minutes under nitrogen flow.

3. The acetal resin composition according to claim 1, wherein the hindered phenol type antioxidant is triethylene glycol-bis[3-(3-t-butyl-5-methyl-4-hydroxyphenyl)propionate], pentaerythrityl-tetrakis[3-(3,5-di-t-butyl-4-hydroxyphenyl)propionate], or 3,9-bis[1,1--dimethyl-2{β-(3-t-butyl-4-hydroxy-5-methylphenyl)-propionyloxy}ethyl-2,4,8,10-tetraoxaspiro[5.5]undecane,1,3,5-tris(4-t-butyl-3-hydroxy-2,6-dimethylbenzyl)isocyanuric acid.

4. The acetal resin composition according to claim 1, wherein the acetal resin composition further comprises 0.05 to 2 parts by weight of a hindered amine type light stabilizer.

5. The acetal resin composition according to claim 1, wherein the ion adsorbent comprises one or more oxides selected from the alkaline metal oxides and the alkaline earth metal oxides, and one or more trivalent metallic oxides.

6. The acetal resin composition according to claim 1, wherein the ion adsorbent has an average particle diameter of 100 μm or less.

7. The acetal resin composition according to claim 1, wherein the alkaline metal oxide is selected from the group consisting of $Li_2O$, $Na_2O$, and $K_2O$, the alkaline earth metal oxide is selected from the group consisting of MgO, SrO, and BaO, and the trivalent metallic oxide is selected from the group consisting of $B_2O_3$, $Al_2O_3$, $Ga_2O_3$, and $In_2O_3$.

8. The acetal resin composition according to claim 7, wherein the alkaline metal oxide is $Na_2O$.

9. The acetal resin composition according to claim 7, wherein the alkaline earth metal oxide is MgO.

10. The acetal resin composition according to claim 7, wherein the trivalent metallic oxide is $Al_2O_3$.

11. The acetal resin composition according to claim 5, wherein the ion adsorbent is $2.5MgO\cdot Al_2O_3\cdot nH_2O$, $Al_2O_3\cdot Na_2O\cdot nH_2O$, $Mg_{0.7}Al_{0.3}O_{1.15}$, or $Mg_{0.75}Al_{0.25}O_{1.125}$.

* * * * *